US006633430B1

(12) United States Patent
Monnard et al.

(10) Patent No.: US 6,633,430 B1
(45) Date of Patent: Oct. 14, 2003

(54) BOOSTER AMPLIFIER WITH SPECTRAL CONTROL FOR OPTICAL COMMUNICATIONS SYSTEMS

(75) Inventors: Rene H. Monnard, Sunnyvale, CA (US); Gordon C. Wilson, New York, NY (US); Jun Ye, Palo Alto, CA (US)

(73) Assignee: Onetta, Inc., Sunnyvale, CA (US)

( * ) Notice: Subject to any disclaimer, the term of this patent is extended or adjusted under 35 U.S.C. 154(b) by 70 days.

(21) Appl. No.: 09/828,840

(22) Filed: Apr. 10, 2001

Related U.S. Application Data

(60) Provisional application No. 60/268,715, filed on Feb. 15, 2001.

(51) Int. Cl.[7] .............................. G02B 6/28; H01S 3/094
(52) U.S. Cl. ............................. 359/337.11; 359/337.13; 359/341.41; 359/341.42
(58) Field of Search ........................ 359/337.1, 337.11, 359/337.13, 341.41, 341.42

(56) References Cited

U.S. PATENT DOCUMENTS

| 5,253,104 | A |   | 10/1993 | Delavaux ..................... 359/341 |
| 5,673,280 | A |   | 9/1997 | Grubb et al. .................. 372/3 |
| 5,859,938 | A |   | 1/1999 | Nabeyama et al. ........... 385/24 |
| 5,861,981 | A |   | 1/1999 | Jabr ............................. 359/341 |
| 5,900,969 | A | * | 5/1999 | Srivastava et al. ............ 359/341 |
| 5,933,552 | A | * | 8/1999 | Fukushima et al. ........... 385/24 |
| 5,946,117 | A | * | 8/1999 | Meli et al. .................... 359/124 |
| 5,969,834 | A |   | 10/1999 | Farber et al. ................. 359/110 |
| 6,049,413 | A | * | 4/2000 | Taylor et al. ................. 359/337 |
| 6,061,171 | A |   | 5/2000 | Taylor et al. ................. 359/341 |
| 6,081,366 | A |   | 6/2000 | Kidorf et al. ................. 359/341 |
| 6,094,298 | A |   | 7/2000 | Luo et al. ..................... 359/346 |
| 6,115,174 | A |   | 9/2000 | Grubb et al. ................. 359/334 |
| 6,134,047 | A |   | 10/2000 | Flood et al. .................. 359/341 |
| 6,157,475 | A |   | 12/2000 | Dugan et al. ................. 359/110 |
| 6,178,038 | B1 |   | 1/2001 | Taylor et al. ................. 359/341 |
| 6,198,572 | B1 | * | 3/2001 | Sugaya et al. ............... 359/337 |
| 6,215,581 | B1 |   | 4/2001 | Yadlowsky ................... 359/337 |

FOREIGN PATENT DOCUMENTS

| EP | 762 667 A2 | 3/1997 |
| WO | WO 97/28584 | 8/1997 |
| WO | WO 99/66607 | 12/1999 |
| WO | WO 99/67609 | 12/1999 |
| WO | WO 00/4613 A1 | 1/2000 |
| WO | WO 00/14909 | 3/2000 |
| WO | WO 00/49721 | 8/2000 |

OTHER PUBLICATIONS

Kakui et al. "Dynamic–Gain–Tilt–Free Long–Wavelength Band Erbium Doped Fiber Amplifiers Utilizing Temperature Dependent Characteristics of Gain Spectrum" $25^{th}$ Optical Fiber Communication Conference, Technical Digest, pp. 6–8,(Mar. 8, 2000).

Masuda "Review of Wideband Hybrid Amplifiers" $25^{th}$ Optical Fiber Communication Conference, Technical Digest, pp. 2–4, (Mar. 7, 2000).

Lewis et al. "Low–Noise High Gain Dispersion Compensating Broadband Raman Amplifier" $25^{th}$ Optical Fiber Communication Conference, Technical Digest, pp. 5–7, (Mar. 7, 2000).

Sun et al. "Average Inversion Level, Modeling and Physics of Erbium–Doped Fiber Amplifiers" IEEE Journal of Selected Topics in Quantum Electronics, vol. 3, No. 4, Aug. 1997.

(List continued on next page.)

Primary Examiner—Nelson Moskowitz
(74) Attorney, Agent, or Firm—G. Victor Treyz

(57) ABSTRACT

An optical amplifier for fiber-optic communications systems is provided. The optical amplifier may have variable optical attenuators for adjusting the power on each of multiple input channels. A multiplexer may be used to combine the input channels onto a single optical path. A gain stage may be used to provide optical gain for the optical signals on the optical path. A control unit may be used to control the variable optical attenuators and the gain stage to produce a desired spectrum.

7 Claims, 12 Drawing Sheets

OTHER PUBLICATIONS

Zhu et al. "1.28 Tbit/s (32×40 Gbit/s) Transmission over 1000 km NDSF Employing Distributed Raman Amplification and Active Gain Flattening" Electroncis Letters, vol. 37, No. 1, pp. 43–45 (Jun. 4, 2001).

Sun et al. "Optical Fiber Amplifiers for WDM Optical Networks" Bell Labs Journal, pp. 187–206, Jan. –Mar., 1999.

Sun et al. "Ultra Wide Band Erbium–Doped Fiber Amplifier with 80nm of Bandwidth" OSA Trends in Optics and Photonics, vol. 16, 1997.

Ono et al. "Automatic Gain Control in Silica–Based EDFA with over 50nm Flat Gain Bandwidth using an all Optical Feedback Loop" $10^{th}$ Optical Amplifiers and their Applications Technical Digest, Jun. 9–11, 1999.

Takeda et al. "Active Gain Tilt Equalization by Preferentially 1.43μm– or 1.48μm– Pumped Raman Amplification" OSA Optical Amplifiers and their Applications, vol. 30, pp. 101–105 (1999).

* cited by examiner

BOOSTER AMPLIFIER WITH SPECTRAL CONTROL FOR OPTICAL COMMUNICATIONS SYSTEMS

This application claims the benefit of provisional patent application No. 60/268,715, filed Feb. 15, 2001.

BACKGROUND OF THE INVENTION

The present invention relates to optical communications systems, and more particularly, to booster amplifiers with spectral conditioning capabilities for fiber-optic communications systems.

Fiber-optic networks are used to support voice and data communications. In optical networks that use wavelength division multiplexing, multiple wavelengths of light are used to support multiple communications channels on a single fiber.

Optical amplifiers are used in fiber-optic networks to amplify optical signals. Typical optical amplifiers are based on erbium-doped fiber coils that are pumped with diodes lasers. In-line optical amplifiers and preamplifiers are used to amplify optical data signals that have been subject to attenuation over fiber-optic links. Booster amplifiers are used to increase the optical signal power being launched into a span of transmission fiber from a transmitter module.

Transmitter modules typically contain a bank of distributed feedback lasers. Each distributed feedback laser provides light at a different wavelength. Each wavelength corresponds to a respective wavelength-division-multiplexing channel. In some systems, data may be transmitted by modulating the distributed feedback lasers directly. In other systems, data may be transmitted by using high-speed modulators to modulate the light from the distributed feedback lasers. The high-speed modulators may be part of the distributed feedback laser devices or may be external modulators such as lithium niobate waveguide modulators.

An optical multiplexer may be used to combine modulated light at different wavelengths from the distributed feedback lasers for transmission on a span of optical fiber. A booster amplifier may be used to increase the signal power of the multiplexed light before it is launched onto the span.

With this type of arrangement, it may be desirable to adjust the optical spectrum of the signals being transmitted before providing the signals to the booster amplifier.

It is therefore an object of the present invention to provide ways in which to modify the power spectrum of the channels being transmitted to a span of optical fiber in a wavelength-division-multiplexing communications link.

It is another object of the present invention to provide a booster amplifier with spectrum conditioning capabilities.

SUMMARY OF THE INVENTION

These and other objects of the invention are accomplished in accordance with the present invention by providing optical amplifier equipment for use in a fiber-optic communications link in which optical signals are transmitted on a series of spans of optical transmission fiber. Optical data signals on channels of different wavelengths may be produced by a transmitter module. A booster amplifier may be used to amplify the optical data signals. The booster amplifier may include a multiplexer that combines the signals at the different wavelengths from the transmitter module onto a single optical fiber. Optical gain stages in the booster amplifier may be used to amplify the optical signals on this fiber. The booster amplifier may include variable optical attenuators or other signal conditioning components that modify the optical spectrum of the optical data signals before the signals are transmitting over the optical communications link.

Further features of the invention and its nature and various advantages will be more apparent from the accompanying drawings and the following detailed description of the preferred embodiments.

DETAILED DESCRIPTION OF THE PREFERRED EMBODIMENTS

The optical amplifiers of the present invention may be used whenever such amplifiers are needed to amplify a light spectrum. As an example, the optical amplifiers of the present invention may be used as subsystem components in optical equipment such as dispersion compensation modules, add/drop modules, switches, receiver modules, transmitter modules, or any other suitable optical communications network equipment. For illustrative purposes, the present invention will be described in the context of using optical amplifiers as booster amplifiers in optical communications networks that support wavelength-division multiplexing.

Figure 1:
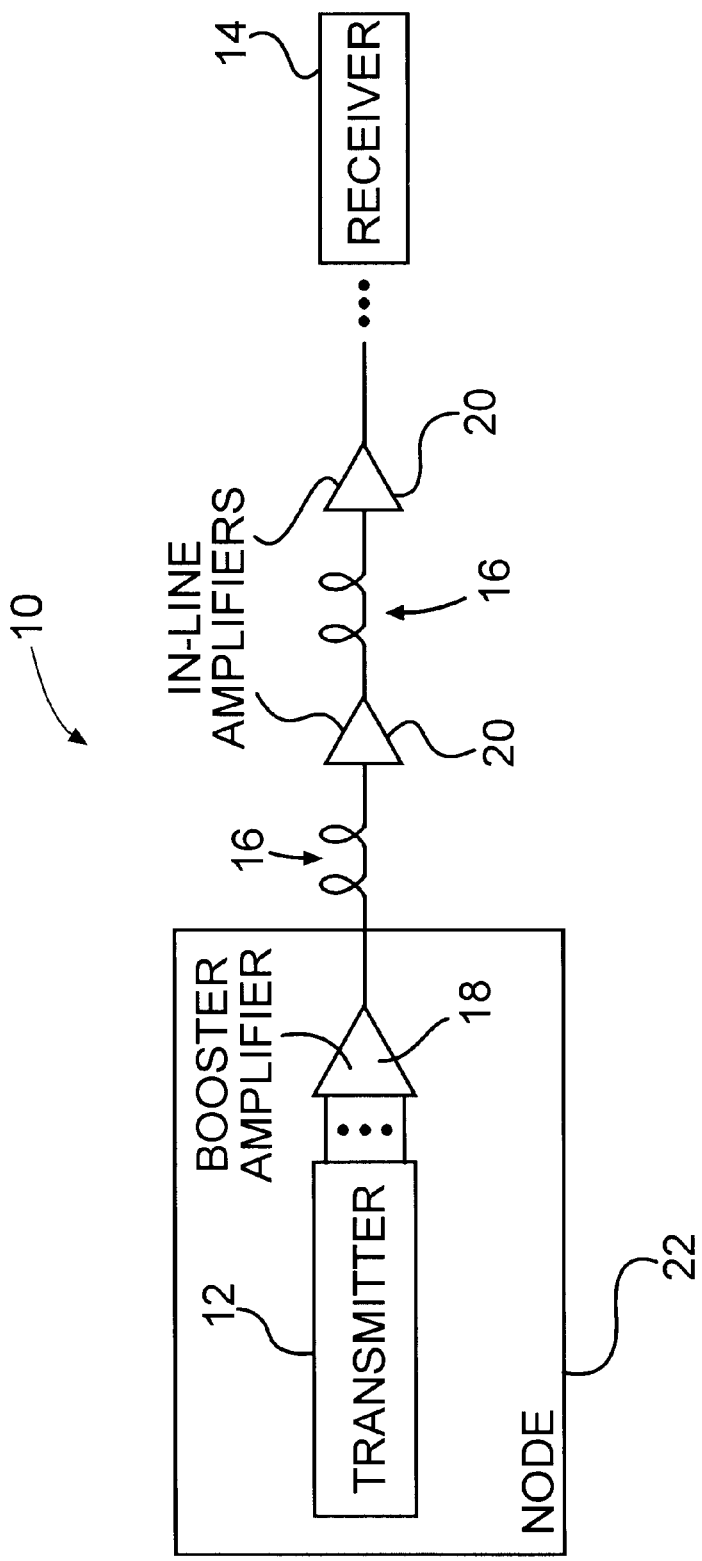
FIG. 1 is a schematic diagram of an illustrative fiber-optic communications link with booster and in-line optical amplifiers in accordance with the present invention.

An illustrative fiber-optic communications link 10 in an optical communications network in accordance with the present invention is shown in FIG. 1. A transmitter 12 may transmit information to a receiver 14 over a series of fiber links. Each fiber link may include a span 16 of optical transmission fiber. Fiber spans 16 may be on the order of 40–160 km in length for long-haul networks or may be any other suitable length for use in signal transmission in an optical communications network.

The communications link of FIG. 1 may be used to support wavelength division multiplexing arrangements in which multiple communications channels are provided using multiple wavelengths of light. For example, the link of FIG. 1 may support a system with 40 channels, each using a different optical carrier wavelength. Optical channels may be modulated at, for example, approximately 10 Gbps (OC-192). The carrier wavelengths that are used may be in the vicinity of 1520–1565 nm. These are merely illustrative system characteristics. If desired, more channels may be provided (e.g., hundreds of channels), signals may be carried on multiple wavelengths, signals may be modulated at slower or faster data rates (e.g., at approximately 2.5 Gbps for OC-48 or at approximately 40 Gbps for OC-768), and different carrier wavelengths may be supported (e.g., wavelengths in the range of 1240–1650 nm).

In-line optical amplifiers 20 may be used to amplify optical signals between successive spans of fiber 16. Booster amplifier 18 may be used at the beginning of link 10 to increase the power from transmitter 12 that is launched onto the initial span 16 of link 10. Booster amplifier 18 and transmitter 12 are typically located at the same network node 22.

Fiber spans 16 may be Raman-pumped. This creates Raman gain in spans 16 that counteracts the attenuation normally experienced along spans 16.

Fiber-optic communications link 10 and other network communications links may be used to support one or more service channels. Service channels or other suitable communications paths may be used to allow a network control and management system to communicate with network equipment. For example, these communications paths may be used by the network control and management system to communicate with transmitter 12 and booster amplifier 18 and other suitable equipment at network nodes such as the node 22 of FIG. 1, optical amplifiers such as amplifiers 20, receivers such as receiver 14, and other suitable equipment. The communications paths may also be used to support direct communications between amplifiers and between amplifiers and other network components.

The communications paths may be based on a telemetry or service channel that uses a particular wavelength or wavelengths on the communications link 10. Communications paths may also be based on a wireless path or may be based on a communications arrangement in which the normal data channels on link 10 are modulated at a low frequency and relatively small modulation depth on top of the normal data carried on those channels.

The network control and management system may be implemented on suitable network computer equipment. Network components such as amplifiers, transmitters, receivers, and other modules may have control units that communicate with the network control and management system. For example, the network control and management system may send commands to a control unit in an amplifier that direct the amplifier to establish a particular gain setting or output power setting. The control unit may assist in the gathering of data on the operation of the amplifier. For example, the control unit may be used to gather information from an optical channel monitor or other components in an amplifier. The status and operational data collected by the control unit may be provided to the network control and management system by the control unit over the service channel or other communications path.

Figure 2:
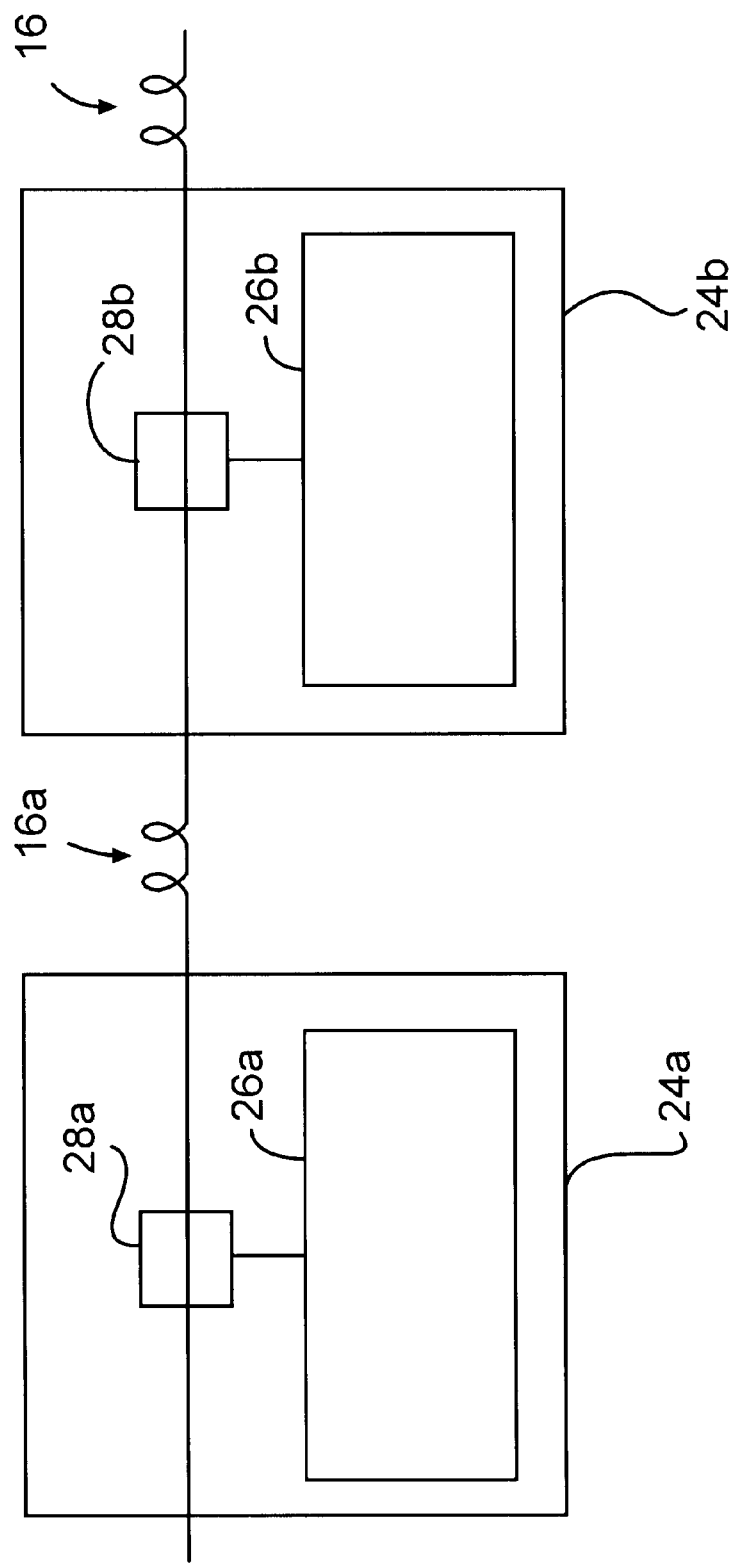
FIG. 2 is a schematic diagram of a portion of a fiber-optic communications link showing the operation of a service channel in accordance with the present invention.

As shown in FIG. 2, a service channel may be supported on the same fiber that is used to carry normal data traffic. In the example of FIG. 2, network equipment 24a may communicate with network equipment 24b over a fiber span 16a. Network equipment 24a and 24b may include control units 26a and 26b. Add/drop service channel filters 28a and 28b may be used to insert optical service channel signals into the fiber path and to remove optical service channel signals from the fiber path without disturbing normal data traffic. If fiber 16a is part of a unidirectional communications link, a link 10 that supports communications in the reverse direction may be used as a return service channel path.

Figure 3:
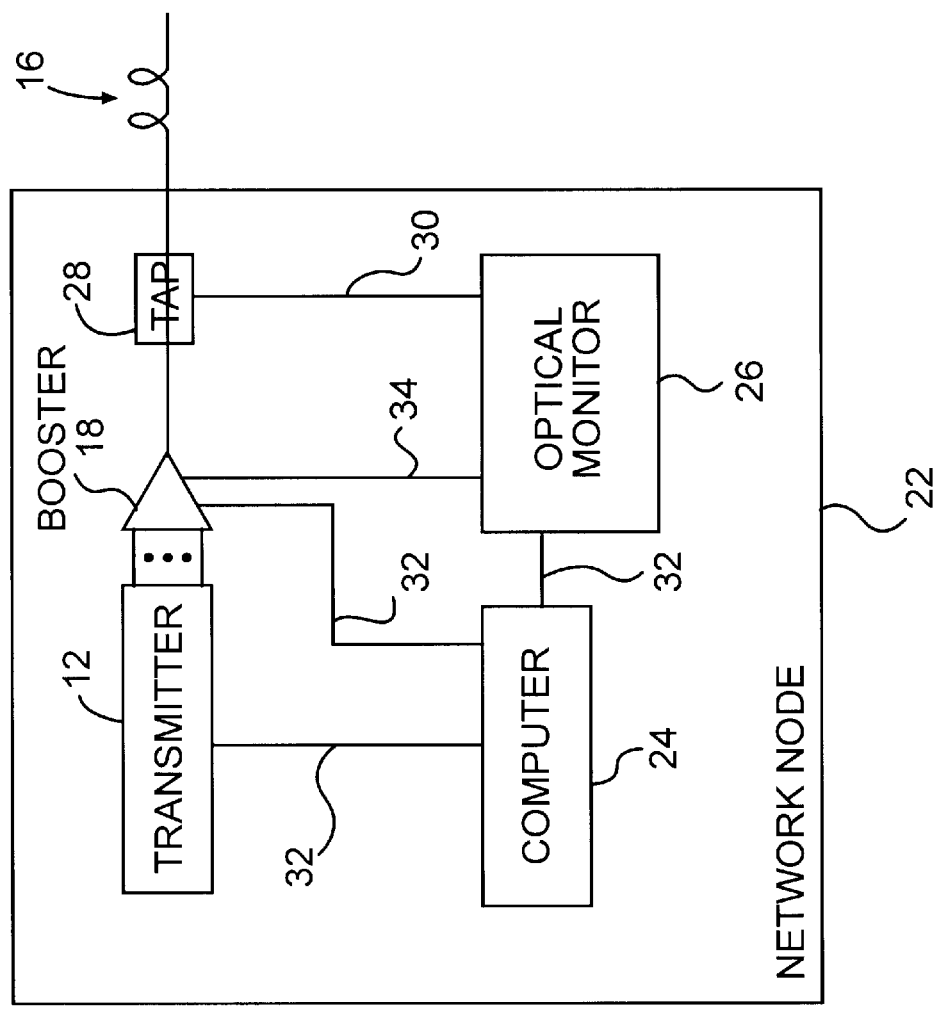
FIG. 3 is a schematic diagram of an illustrative network node at which a booster amplifier may be used to amplify optical signals from a transmitter in accordance with the present invention.

Illustrative equipment that may be provided at a network node 22 that includes a transmitter 12 and a booster amplifier 18 is shown in FIG. 3. One or more computers such as computer 24 may be used at node 22 to support the operation of the equipment at node 22. Computer 24 may be a microprocessor-based control unit or any other suitable computing equipment. Computer 24 may be used to support the network control and management functions of the network control and management system and may be used to communicate with other portions of the network control and management system over a service channel or other suitable communications path.

An optical monitor 26 (e.g., an optical detector, optical spectrum analyzer, optical channel monitor, or other suitable optical monitoring equipment) may be used to monitor optical signals in link 10. Optical signals in link 10 may be tapped at any suitable location or locations in link 10 using one or more optical taps such as tap 28. Such taps may be, for example, wavelength-insensitive taps that tap a relatively small fraction (e.g., 2%) of the optical power from the fiber path on which the optical signals on link 10 are traveling.

Tapped optical signals from tap 28 may be provided to optical monitor 26 over fiber path 30. Computer 24 may communicate with equipment such as transmitter 12, booster 18, and optical monitor 26 over electrical paths 32.

With the arrangement of FIG. 3, the optical spectrum of the optical signals being launched into fiber span 16 from the output of booster amplifier 18 may be monitored in real time. Information on this spectrum may be provided to computer 24 for analysis by the network control and management system. Information on the spectrum may also be provided to booster 18 over electrical path 34. Booster amplifier 18 may control the spectrum of the light launched into fiber 16 accordingly.

If desired, optical monitors such as monitor 26 may be located at other network nodes and spectral information may be transmitted to the equipment at node 22 over a service channel or other communications path. An optical monitor such as optical monitor 26 may also be integrated within booster amplifier 18.

Figure 4:
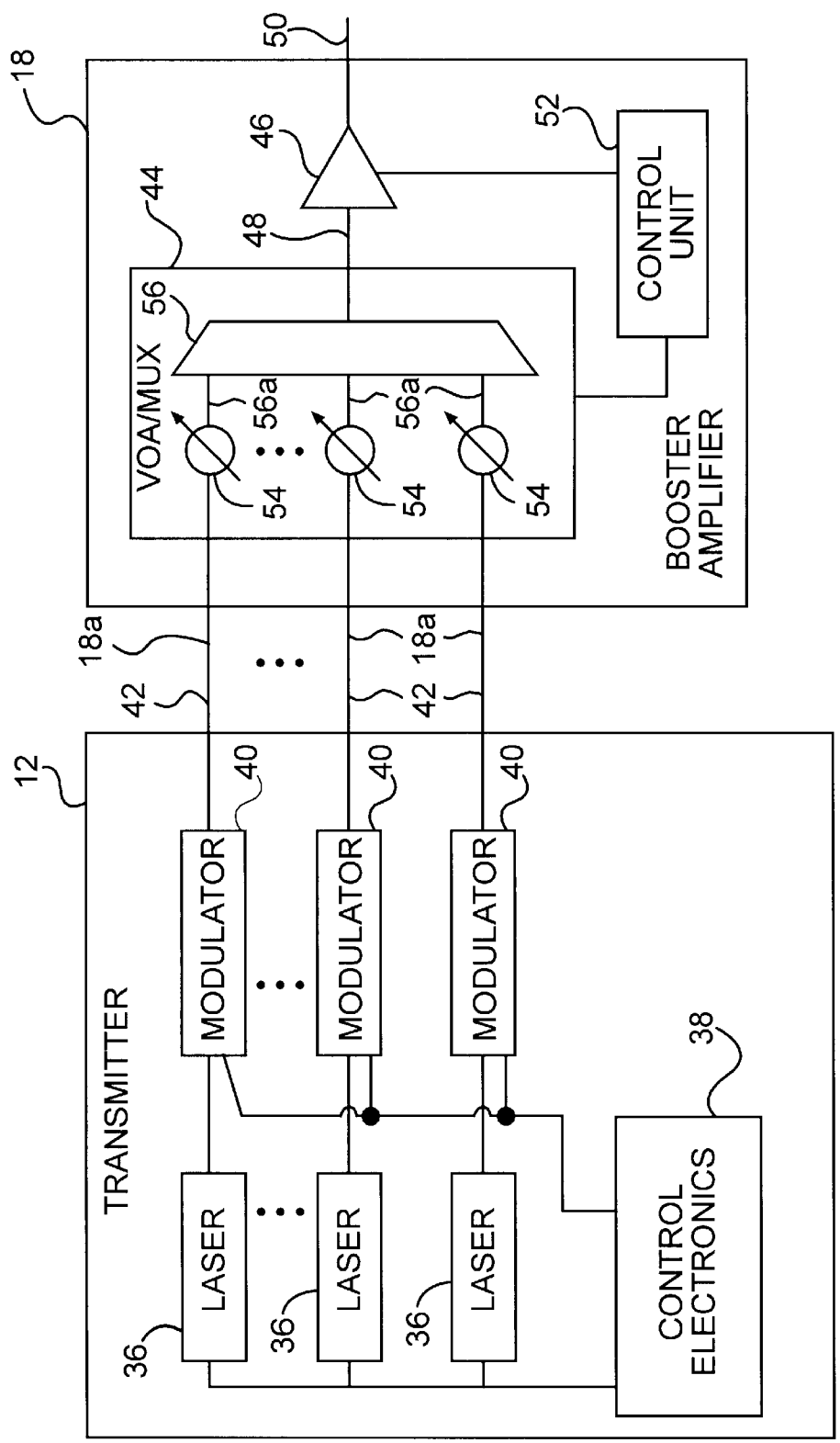
FIG. 4 is a schematic diagram of an illustrative transmitter and an illustrative booster amplifier in accordance with the present invention.

An illustrative transmitter 12 and booster amplifier 18 are shown in FIG. 4. Transmitter 12 may include a number of lasers 36. There may be, for example, 40 or 160 or any other suitable number of lasers in transmitter 12. Each laser may operate at a different wavelength that corresponds to one of the channels in a wavelength-division-multiplexing system. Lasers 36 may be diode lasers such as distributed feedback lasers. Lasers 36 may be directly modulated by control electronics 38 or modulators 40 may be used to modulate the light from lasers 36. Modulators 40 may be provided as part of lasers 36 or may be external modulators. Suitable external modulators include, for example, high-speed lithium niobate modulators.

With the arrangement of FIG. 4, data at 10 Gbps or 40 Gbps or other suitable data rates may be carried on the carrier signals produced by lasers 36. The modulated light carrying the data to be transmitted along link 10 may be provided from the outputs of transmitter 12 to the inputs of booster amplifier 18 over a set of optical fibers 42. Fibers 42 may be individual fibers or may be part of one or more ribbon fibers each of which contains multiple fiber paths. The outputs of transmitter 12 and the inputs 18a of booster amplifier 18 may be provided with suitable connectors so that fibers 42 may be connected between transmitter 12 and booster amplifier 18 by a field technician or other suitable personnel.

Booster amplifier 18 may include a variable optical attenuator multiplexer unit (VOA/MUX) 44 and one or more gain blocks or stages such as gain stage 46. Unit 44 may be used to modify the optical spectrum of the optical signals provided at the inputs 18a to amplifier 18. Unit 44 may also be used to combine the signals from each of fibers 42 onto a single fiber path 48. The signals on the single fiber path 48 may be amplified by amplifier gain stage 46 and provided as corresponding amplified output signals at output 50.

The operation of unit 44 and stage 46 may be controlled using one or more control units such as control unit 52. Control unit 52 may be based on any suitable control electronics and may include one or more microprocessors, microcontrollers, digital signal processors, programmable logic devices, application-specific integrated circuits, digital-to-analog converters, analog-to-digital converters, analog control circuits, memory devices, etc.

Control unit 52 may include communications circuitry for communicating with network equipment. For example, control unit 52 may include communications circuitry for communicating with the network control and management system over a service channel or other communications path.

Variable optical attenuator multiplexer unit 44 may include variable optical attenuators 54 and an optical multiplexer 56. Each variable optical attenuator 54 may be used to selectively introduce a desired amount of optical attenuation into the optical path between a given input 18a of amplifier 18 and a respective input 56a of multiplexer 56. An advantage of this approach is that the power of each channel from transmitter 12 may be controlled individually. If desired, the channel powers may be adjusted sufficiently with variable optical attenuators 54 to flatten the output spectrum of amplifier 18 without using passive gain flattening filters in amplifier 18.

Multiplexer 56 may be an arrayed waveguide (AWG) multiplexer, a multiplexer based on thin-film technology, a multiplexer that is based on a micro-electro-mechanical system (MEMS) device, or any other suitable optical multiplexer. Variable optical attenuators 54 may be mechanical variable optical attenuators, variable optical attenuators formed from thermo-optic devices such as silica-based or semiconductor-based Mach-Zehnder devices, micro-electro-mechanical systems devices, acoustooptic devices (e.g., acoustooptic fiber devices), liquid crystal devices, electrooptic devices, semiconductor devices, or any other suitable variable optical attenuator arrangements. If desired, variable optical attenuators 54 may be provided using discrete variable optical attenuator devices, using one or more variable optical attenuator arrays, or using variable optical attenuators that are part of the same device as multiplexer 56.

Control unit 52 may receive information on the spectrum of the optical signals in amplifier 18 or elsewhere in link 10 from an optical monitor. The information on the monitored optical signals and information on the desired output spectrum that is to be produced at output 50 may be used by control-unit 52 in controlling unit 44 and stage 46. For example, control unit 52 may use this information when adjusting variable optical attenuators 54 and when adjusting pump power settings and other settings involved in operating stage 46.

Figure 5:
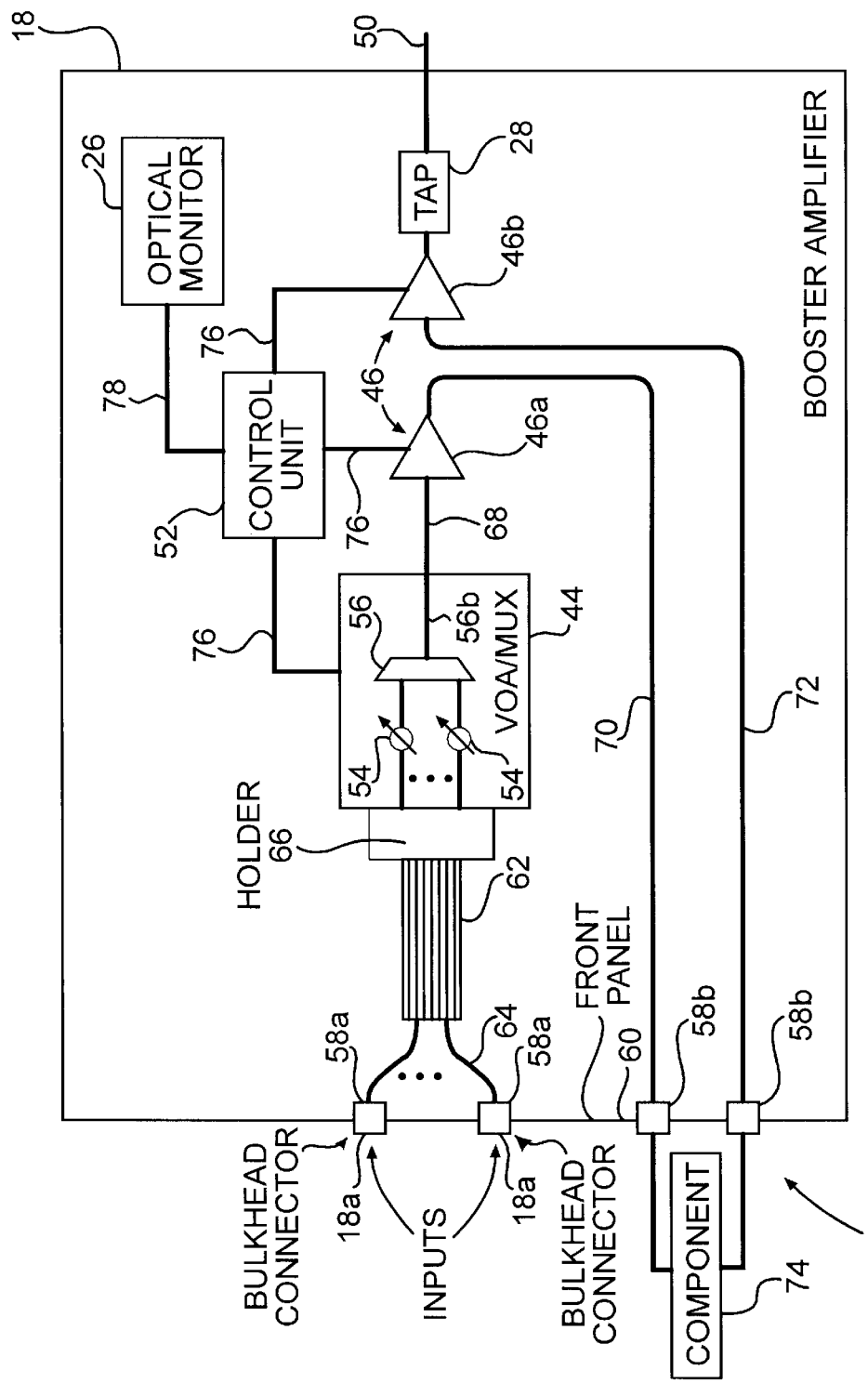
FIG. 5 is a schematic diagram of an illustrative booster amplifier in accordance with the present invention.

An illustrative booster amplifier 18 is shown in FIG. 5. In the example of FIG. 5, booster amplifier 18 has an internal optical monitor 26 that monitors optical signals using a tap 28 that is located in the fiber path before output 50. This arrangement is merely illustrative. For example, more taps 28 may be used and taps 28 may be used at different locations in the fiber path in amplifier 18.

Input signals from transmitter 12 may be provided to amplifier 18 at inputs 18a. Bulkhead connectors 58a that are connected to front panel 60 of amplifier 18 may be used at inputs 18a to provide attachment sites for fibers 42 (FIG. 4).

Inputs 18a may be connected to variable optical attenuator multiplexer unit 44 using any suitable optical paths. For example, inputs 18a may be connected to unit 44 using discrete fibers or a fiber ribbon. A fiber ribbon arrangement is shown in FIG. 5. Fiber ribbon 62 is connected to inputs 18a using individual fiber strands 64 from the fiber ribbon 62. A holder 66 such as a V-groove holder or individual fiber strands may be used to couple the fibers in fiber ribbon 62 to unit 44. Unit 44 may use variable optical attenuators 54 to modify the optical spectrum of the light provided to the inputs of unit 44 on a channel-by-channel basis before these signals are combined onto a single optical path 56b by multiplexer 56.

Optical path 56b is coupled to fiber 68. Fiber 68 may provide the combined optical signals with the spectrum that has been modified using variable optical attenuators 54 to the input of gain stage 46.

Gain stage 46 may be based on a single gain stage or may include first and second stages 46a and 46b. Stages 46a and 46b may each contain one or more individual gain stages. The region of amplifier 18 between stages 46a and 46b may be referred to as the mid-stage of amplifier 18.

Fibers 70 and 72 may be used to provide mid-stage access for amplifier 18. Mid-stage access may be provided by connecting fibers 70 and 72 to bulkhead connectors 58b on front panel 60 of amplifier 18. Components such as component 74 may be connected between connectors 58b. For example, a length of dispersion-compensating fiber or other dispersive element, a spectral filter, or a short length of single-mode fiber may be connected between connectors 58b.

After the light from the output of stage 46 passes through fiber 70, component 74, and fiber 72, this light may be amplified by gain stage 46b and provided to output 50.

Electrical paths 76 may be used to connect control unit 52 and unit 44, gain stage 46a, and gain stage 46b. Electrical path 78 may be used to connect control unit 52 to optical monitor 26. Other electrical paths may be used to connect control unit 52 to computers at network node 22 such as computer 24 of FIG. 3. Using these paths, control unit 52 may control the operation of unit 44 (e.g., to adjust the settings of the variable optical attenuators 54) and the operation of stages 46a and 46b (e.g., to adjust the powers of the pumps or other components used to provide optical gain) based on information received from internal or external optical monitors.

Figure 6:
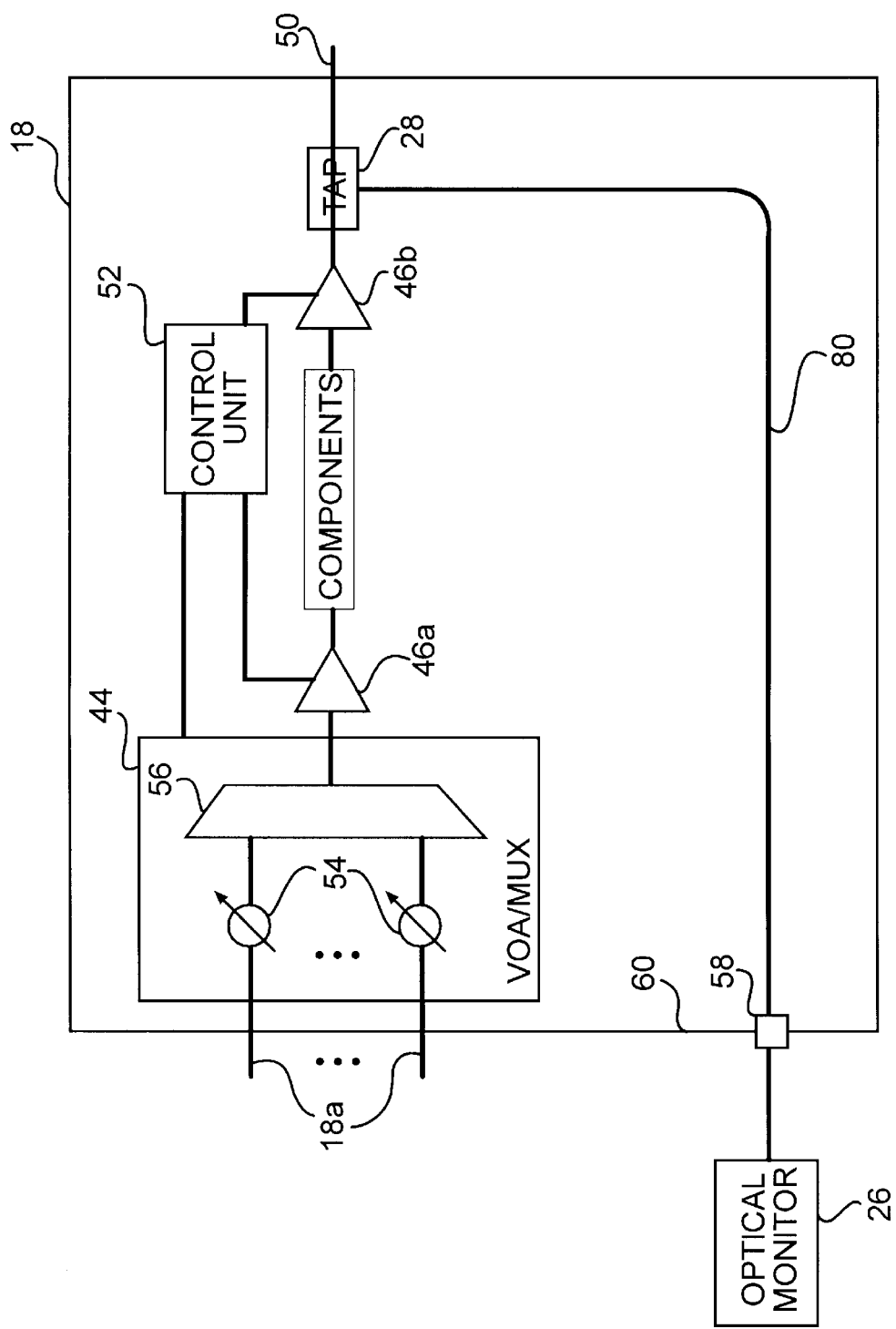
FIG. 6 is a schematic diagram of another illustrative booster amplifier in accordance with the present invention.

A booster amplifier 18 having front panel optical ports for optical monitoring is shown in FIG. 6. In the example of FIG. 6, a tap such as tap 28 may be used to provide optical signals to an external optical monitor 26 via fiber 80 and bulkhead connector 58. Optical monitor 26 may be used to measure the total optical power at the output of amplifier 18. If desired, an optical filter in path 80 or in optical monitor 26 may be used to measure the optical power for each of the channels handled by amplifier 18. Information on the output power spectrum of amplifier 18 may be used in controlling the operation of amplifier 18.

Components 82 may be used in amplifier 18. Components 82 may be located at the mid-stage of amplifier 18 or at any suitable location within the optical path of amplifier 18. Such components may include additional taps for optical monitoring, filters such as passive or active optical filters, wavelength-division-multiplexing couplers, circulators, isolators, attenuators, dispersion-compensating elements, etc.

When amplifier 18 is used in an optical network, a control unit such as control unit 52 may be used to control the variable optical attenuator multiplexer unit 44 and the components in gain stages 46a and 46b to obtain a desired gain or output power spectrum. Various control techniques may be used to maintain the desired gain or output power spectrum for amplifier 18 during operation. For example, optical monitoring equipment may be used to monitor the optical signals in amplifier 18 and elsewhere along link 10. The information from the optical monitoring equipment may be used in determining whether the settings of amplifier 18 should be adjusted. Optical monitoring equipment such as detectors in amplifier 18 may also be used to detect relatively rapid fluctuations in the input signals and other signals in amplifier 18. This type of arrangement may be used to detect changing conditions that would cause gain transients in amplifier 18 if not immediately corrected.

Gain stage 46 may be based on any suitable components for providing optical gain. For example, gain stage 46 may be based on optically-pumped fibers. Fiber may be optically pumped to produce Raman gain. Optical gain may also be produced using optically-pumped rare-earth-doped fibers such as erbium-doped fibers. If desired, gain stage 46 may be based on rare-earth-doped waveguide amplifiers or semiconductor optical amplifiers. Combinations of these gain media may also be used for gain stage 46.

If gain stage 46 is based on a semiconductor optical amplifier, the gain produced by gain stage 46 may be controlled by controlling the drive current used to control the semiconductor optical amplifier device. If gain stage 46 is based on an optically pumped media (e.g., an optically-pumped fiber), the gain of stage 46 may be controlled by controlling the pump power produced by the optical pump or using other suitable control techniques. Suitable pumps for Raman and rare-earth-doped fiber amplifiers include diode lasers. For example, an erbium-doped fiber amplifier may be pumped using diode lasers operated at wavelengths of 980 nm or 1480 nm. In an erbium-doped fiber amplifier, control unit 54 may control the gain produced by gain stage 46 by increasing or decreasing the pump power produced by these pumps.

When the gain of stage 46 is changed (e.g., by controlling the pump powers used in optically pumping the fiber in stage 46), a spectral tilt or other change in the shape of the gain spectrum of stage 46 and amplifier 18 may be produced. A dynamic spectral filter in stage 46 may be used to compensate for this change. The values of the attenuations produced by variable optical attenuators 54 may also be changed to compensate for this change.

A series of graphs that illustrate one suitable way in which control unit 52 may control the operation of amplifier 18 to obtain and maintain a desired gain spectrum are shown in FIGS. 7a, 7b, 7c, and 7d. In the example of FIGS. 7a, 7b, 7c, and 7d, the desired spectrum for amplifier 18 is given by solid line 84. In general, the desired spectrum for amplifier 18 may be provided as a desired gain spectrum or a desired output power spectrum. In this example, the desired spectral shape 84 is an output power spectrum.

Optical monitoring equipment in amplifier 18 or elsewhere in the network may be used to measure the current optical gain or output power spectrum of amplifier 18. In the example of FIGS. 7a, 7b, 7c, and 7d, the output power spectrum has been measured and is represented by dotted line 86.

Figure 7A:
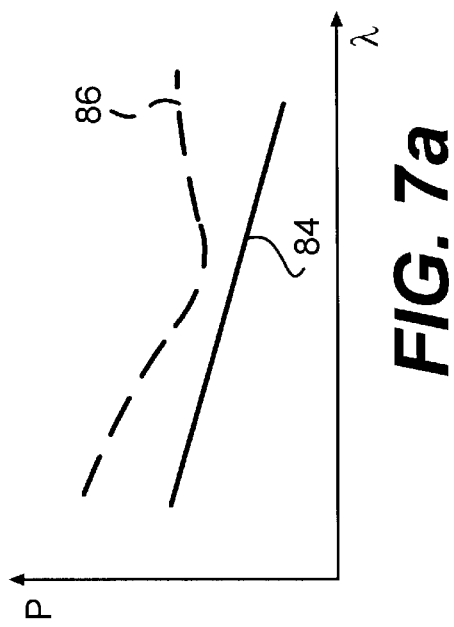
FIGS. 7a, 7b, 7c, and 7d are graphs showing how a booster amplifier of the present invention may be controlled to produce a desired output spectrum in accordance with the present invention.

During system initialization, all variable optical attenuators 54 may be set to produce their minimum attenuation and the amplifier may be placed in a constant gain mode at a given gain setting. An initial spectrum 86 may be measured. In general, the measured spectrum 86 may differ from the desired spectrum in both average magnitude and in spectral shape. For example, the measured spectrum 86 may be greater than the desired spectrum 84 at each wavelength in the wavelength band being handled by amplifier 18. This type of situation is shown in FIG. 7a. In this situation, the average gain of amplifier 18 may be adjusted (e.g., by reducing the optical pump power for stage 46).

Figure 7B:
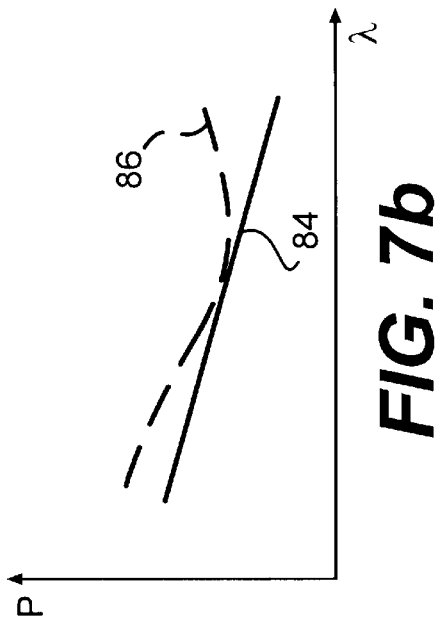

The gain of amplifier 18 may, for example, be reduced until the spectrum 86 matches (or is expected to match) spectrum 84 for at least one wavelength while all other points in the spectrum 86 remain at or above spectrum 84, as shown in FIG. 7b. The spectrum 86 may be measured one or more times as this adjustment is being made or after the adjustment has been made.

Figure 7C:
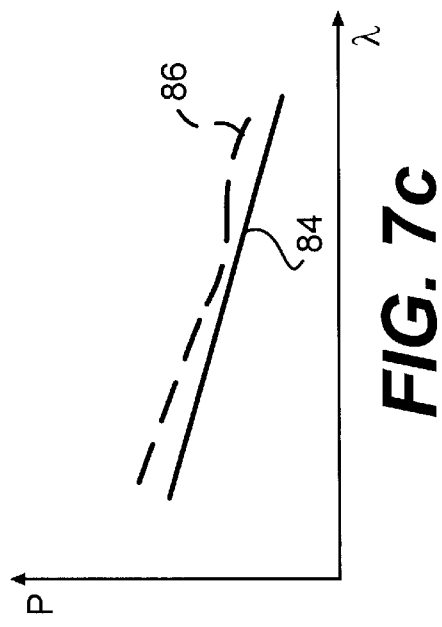

The settings of variable optical attenuators 54 may then be adjusted to change the shape of the spectrum produced by amplifier 18 so that this shape more closely matches the shape of spectrum 86. As an example, each variable optical attenuator 54 may be adjusted to produce an amount of attenuation for its channel wavelength that is nominally expected to close the gap between spectrum 86 and spectrum 84 at that wavelength. After this adjustment, the measured spectrum 86 may appear as shown in FIG. 7c. Because the variable optical attenuator adjustments will generally affect the gain spectrum of stage 46 (although the average gain is maintained at its previously set level), the shape of spectrum 86 produced at the output 50 may not match spectrum 84, as shown in FIG. 7c.

Figure 7D:
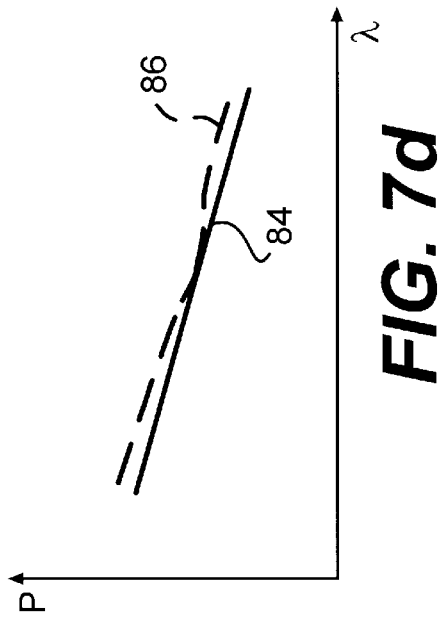

Accordingly, the gain of amplifier 18 may be adjusted again. In this example, the gain of amplifier 18 may be decreased slightly further to decrease the average gain level until at least one point of the measured spectrum 86 matches the desired spectrum while all other points of the measured spectrum remain at or above the desired spectrum values, as shown in FIG. 7d. By continually repeating the interleaved steps of adjusting the variable optical attenuators and adjusting the pump powers of gain stage 46, control unit 52 may make the measured spectrum 86 match the desired spectrum 84. If desired, when the settings of the variable optical attenuators 54 are adjusted to produce the attempted spectral match described in connection with FIG. 7c, any amount of attenuation above the minimum attenuations of attenuators 54 that is common to all of the variable optical attenuators 54 may be removed from all attenuators 54, before the gain of stage 46 is adjusted to produce the change in spectrum 86 described in connection with FIG. 7d. This approach tends to ensure that at least one variable optical attenuator 54 will be at its minimum attenuation setting and that the total input attenuation will be minimized. The gain that gain stage 46 is required to produce may also be minimized using this technique. Moreover, the noise figure performance of amplifier 18 may be enhanced and the dynamic range requirements for variable optical attenuators 54 may be reduced.

Figure 8:
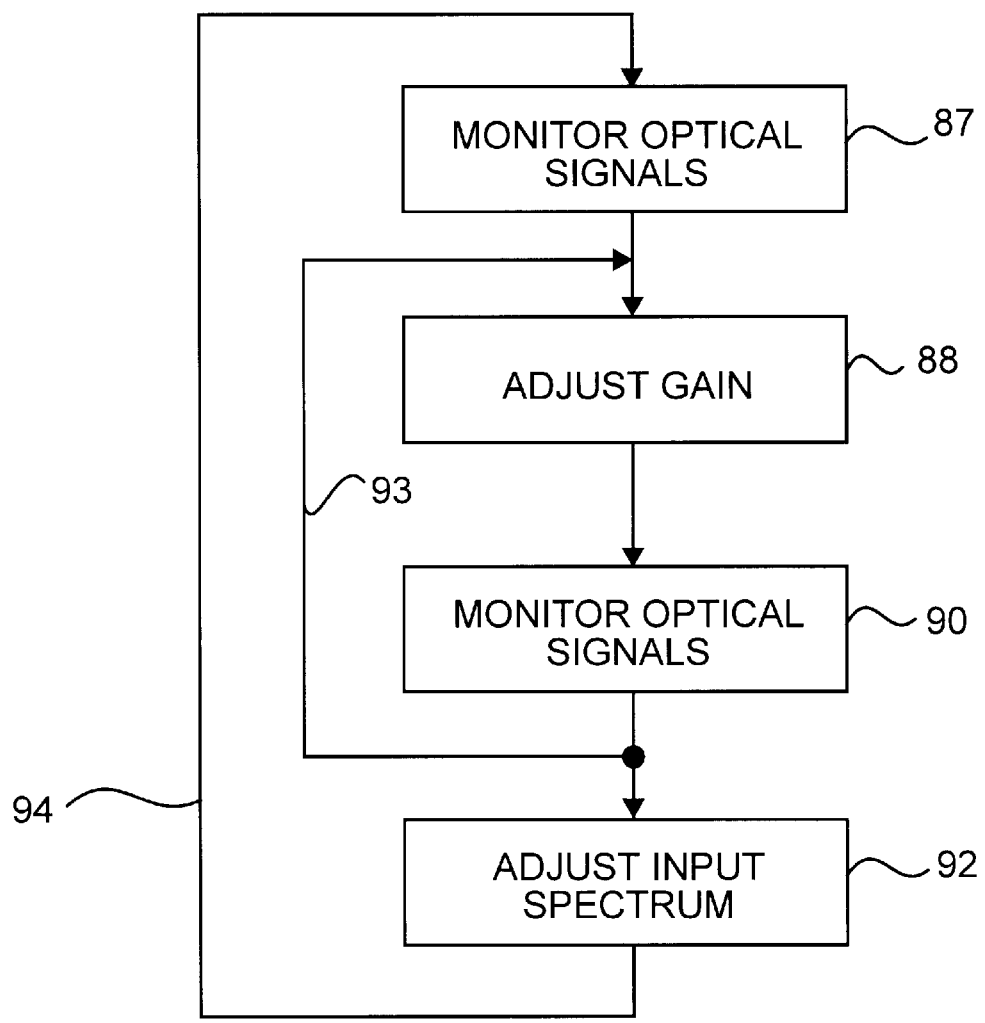
FIG. 8 is a flow chart of illustrative steps involved in controlling a booster amplifier in accordance with the present invention.

Illustrative steps involved in controlling the variable optical attenuators 54 of unit 44 and the pumps or other components in amplifier gain stage 46 that are used to adjust the gain of stage 46 are shown in FIG. 8. At step 87, optical monitor 26 may be used to monitor the optical gain or power spectrum of gain stage 46 or amplifier 18. If optical monitor 26 is stand-alone optical monitoring equipment, the spectral information from optical monitor 26 may be provided to computer 24 and control unit 52 over a service channel, electrical path, or other suitable communications path in the network. If optical monitor 26 is part of amplifier 18, a path such as path 78 of FIG. 5 may be used to convey the measured optical signal information from optical monitor 26 to control unit 52.

Information on the desired spectral shape for amplifier 18 may be stored in control unit 52 or in an external computer such as computer 24. The control unit 52 or external computer may be used to determine the appropriate gain adjustment to be made to gain stage 46 based on the measured optical signals from optical monitor 26 and based on the stored information on the desired spectrum for amplifier 18.

At step 88, control unit 52 may be used to adjust the pump powers of the laser diodes in gain stage 46 or to otherwise adjust the gain of stage 46. The adjustment of FIG. 8 may be made in response to commands from computer 24 or other network equipment or may be made by control unit 52 based on calculations made by control unit 52 using the stored desired spectral information and the measured spectral information.

The spectrum may be measured again at step 90. As shown by line 93, the gain adjustment procedure of step 88 and the spectrum measurement procedure of step 90 may be repeated a number of times until the desired and measured spectra match as shown in FIG. 7b.

Although the gain of stage 46 was adjusted at step 88, in general there may be residual differences between the shapes of the monitored optical spectrum and the desired optical spectrum, as shown in FIG. 7b. The settings of variable optical attenuators 54 may therefore be adjusted at step 92 to reduce the difference between the shape of the spectrum of amplifier 18 and the desired spectrum.

As indicated by line 94, steps 87, 88, 90, and 92 may be repeated. For example, the steps in this loop may be repeated continuously, may be repeated periodically according to a schedule, or may be repeated for a number of times on demand in response to a command. The steps in the loop of FIG. 8 may also be performed whenever certain conditions are satisfied (e.g., when the difference between the measured and desired spectra exceeds a given amount).

The steps of FIG. 8 are merely illustrative. Any suitable control technique may be used to monitor and adapt the spectrum of amplifier 18 to a desired spectrum by adjusting the gain of stage 46 and the settings of variable optical attenuators 54. For example, the gain of stage 46 and the settings of variable optical attenuators 54 may be adjusted simultaneously or in a different order or sequence of steps or with a different frequency than shown in FIG. 8.

Moreover, the operation of stage 46 may be simultaneously controlled to prevent gain transients due to sudden changes in the input power to amplifier 18. Such sudden changes may arise, for example, due to a fiber break, a transmitter failure, or an equipment reconfiguration. Gain transients are generally undesirable because they. cause output power fluctuations on the signal channels that propagate along communications link 10.

Figure 9:
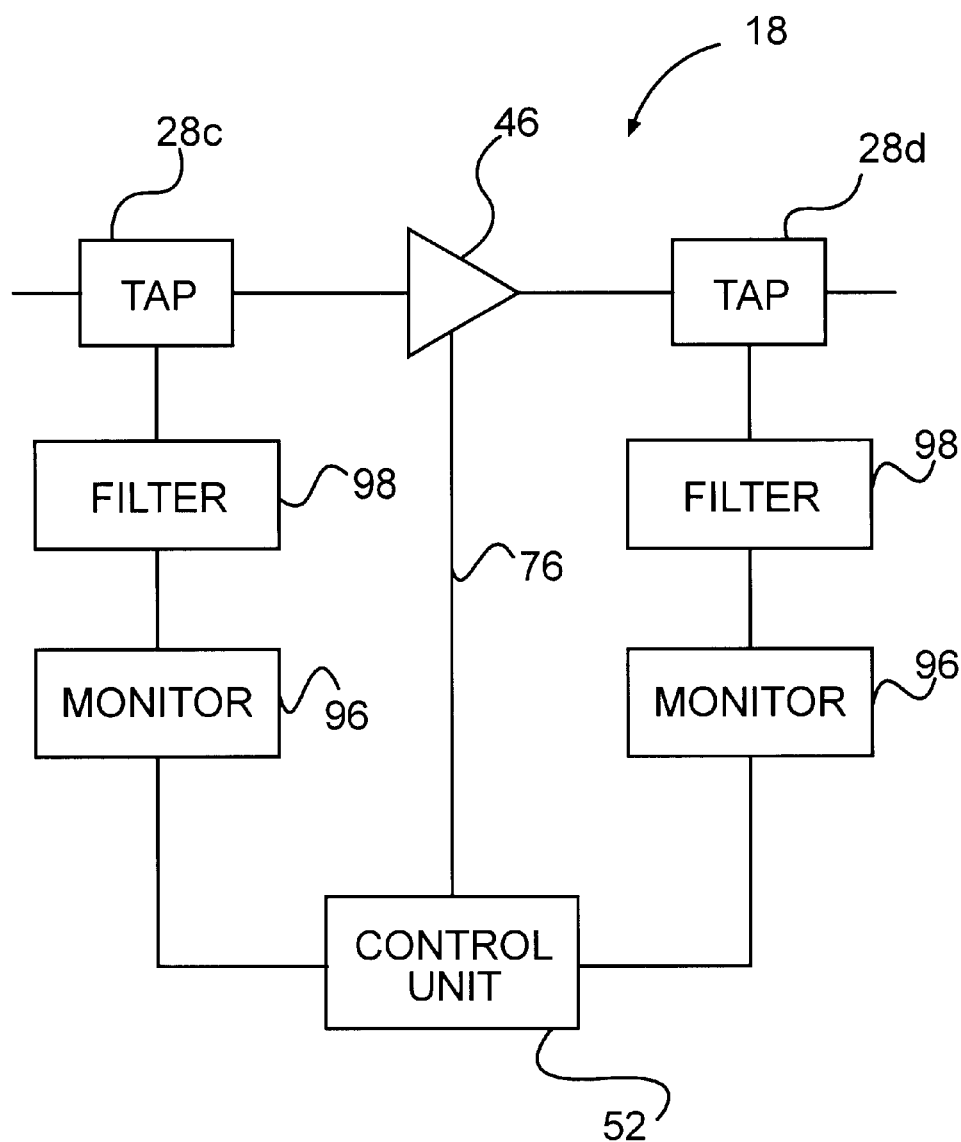
FIG. 9 is a schematic diagram of a portion of a booster amplifier showing how optical taps and monitoring circuitry may be used to monitor optical signals in the amplifier to control transients in accordance with the present invention.

Any suitable arrangement may be used in amplifier 18 to suppress gain transients. One illustrative arrangement that may be used is shown in FIG. 9. In the example of FIG. 9, amplifier 18 has an input tap 28c and an output tap 28d. Light traveling along the main fiber path in amplifier 18 from fiber 100 to fiber 102 may be tapped by taps 28c and 28d and processed by monitors 96. Monitors 96 may be based on any suitable monitoring circuitry. For example, monitors 96 may include photodetectors that convert light signals into electrical signals and transimpedance amplifiers that convert current signals from the photodetectors into voltage signals for processing by the analog or digital circuitry for control unit 52.

By tapping the input and output power for amplifier gain stage 46, the gain of amplifier gain stage 46 may be monitored in real time. This allows the control unit 52 to control the pump power (or other parameters that control the gain of stage 46 such as semiconductor optical amplifier drive current) in real time to ensure that the gain of stage 46 remains constant at a desired gain setting. If desired, control unit 52 may monitor the output power from stage 46 (e.g., using tap 28d) and may control. stage 46 based on the measured output power. This allows the output power of stage 46 to be maintained at a constant desired level.

Control unit 52 may control stage 46 based on input power measurements. For example, the pump power for stage 46 may be increased or decreased appropriately as soon as a significant input power fluctuation is detected. This type of feed-forward control scheme may be used with or without using feedback. Feedback control techniques involve measuring the gain or output power of stage 46 and adjusting the pump level or other parameter of stage 46 in. real time to maintain a desired gain or output power level. Such techniques may be used independently or in combination with feed-forward control techniques.

If desired, gain transient control techniques may be used that involve one or more input or output spectral filters 98. Such filters may modify the entire spectra of the tapped input and output signals or may be used to make power measurements for a particular channel or channels. The modified measured powers or the power of the particular channel or channels may be used in a feedback control scheme or other suitable control scheme for adjusting the pump powers. Spectral filters such as filters 98 may be used to modify the spectral shape of the tapped light that is monitored by monitors 96 so that feedback and feed-forward techniques may be used when the gain spectrum of stage 46 or the gain spectrum of the rare-earth-doped fiber coils or other gain media in stage 46 are not flat.

Figure 10:
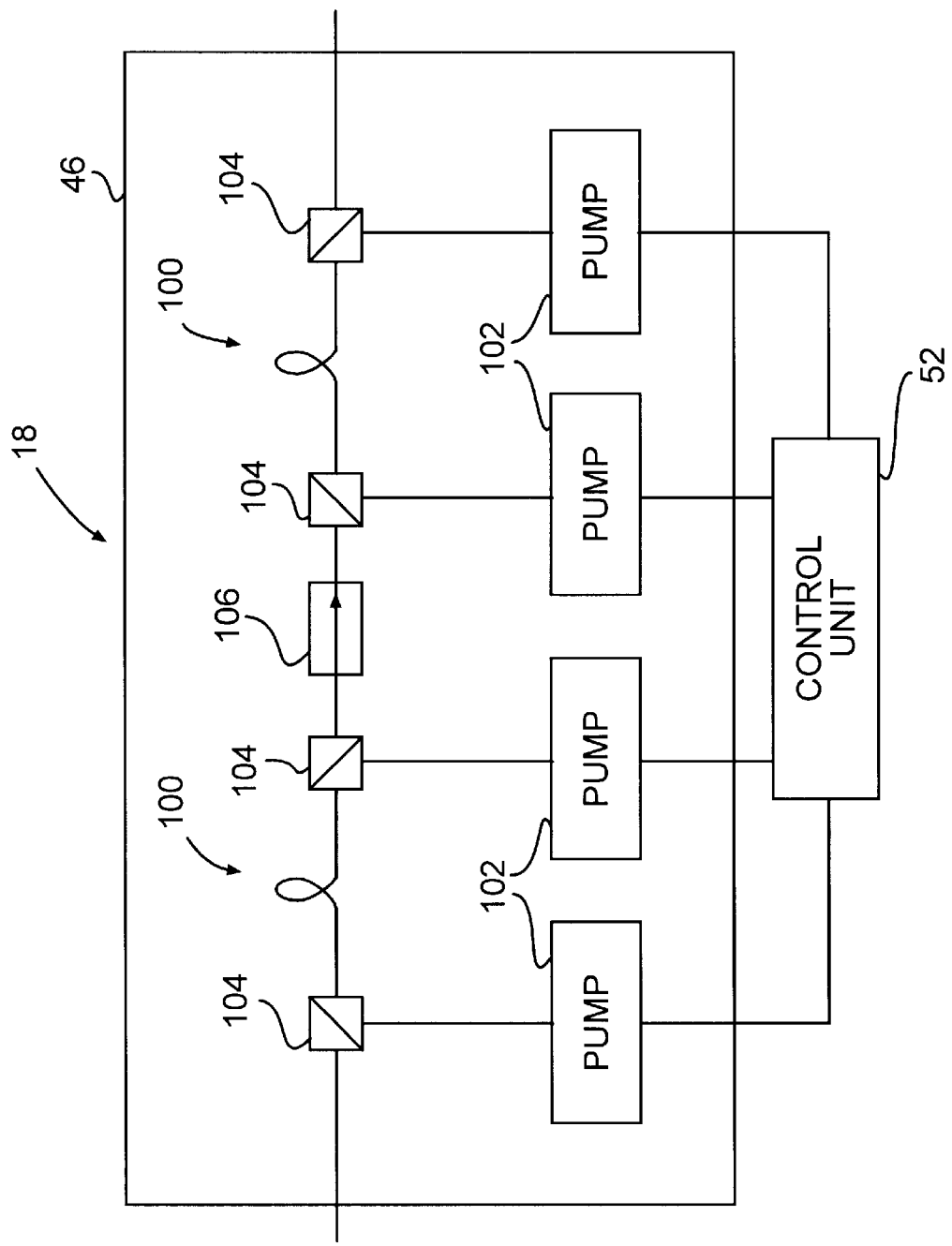
FIG. 10 is a schematic diagram of a portion of an illustrative booster amplifier showing how the gain stages of the amplifier may include coils of optically-pumped fiber in accordance with the present invention.

An illustrative gain stage 46 in a booster amplifier 18 that is based on two rare-earth-doped fiber coils 100 is shown in FIG. 10. Coils 100 may be, for example, erbium-doped fiber coils. Coils 100 may be optically pumped using pumps 102.

Pumps 102 may be based on one or more laser diodes or other suitable sources of pump light. Pumps 102 may be controlled by control unit 52. For example, control unit 52 may adjust the power produced by one or more of pumps 102 in real time by adjusting the drive current that is applied to pumps 102.

Light from pumps 102 may be coupled into fiber 100 using pump couplers 104. Pump couplers 104 may be wavelength-division-multiplexing (WDM) couplers, pump couplers based on circulator arrangements or any other suitable pump couplers. An isolator 106 may be placed between coils 100.

Stage 46 may or may not have additional components such as additional taps for optical monitoring, additional filters such as passive or active optical filters, wavelength-division-multiplexing couplers, circulators, isolators, dispersion-compensating elements, variable optical attenuators, etc. Moreover, any suitable number of coils 100 may be used (e.g., one coil, two coils, three coils, more than three coils, etc.). Coils 100 may be supplemented or replaced by Raman-pumped coils (e.g., coils that use dispersion-compensating fiber, single mode fiber, small core fiber, etc.). Other types of gain media such as semiconductor optical amplifier gain media or rare-earth-doped waveguide media may also be used in stage 46.

Figure 11:
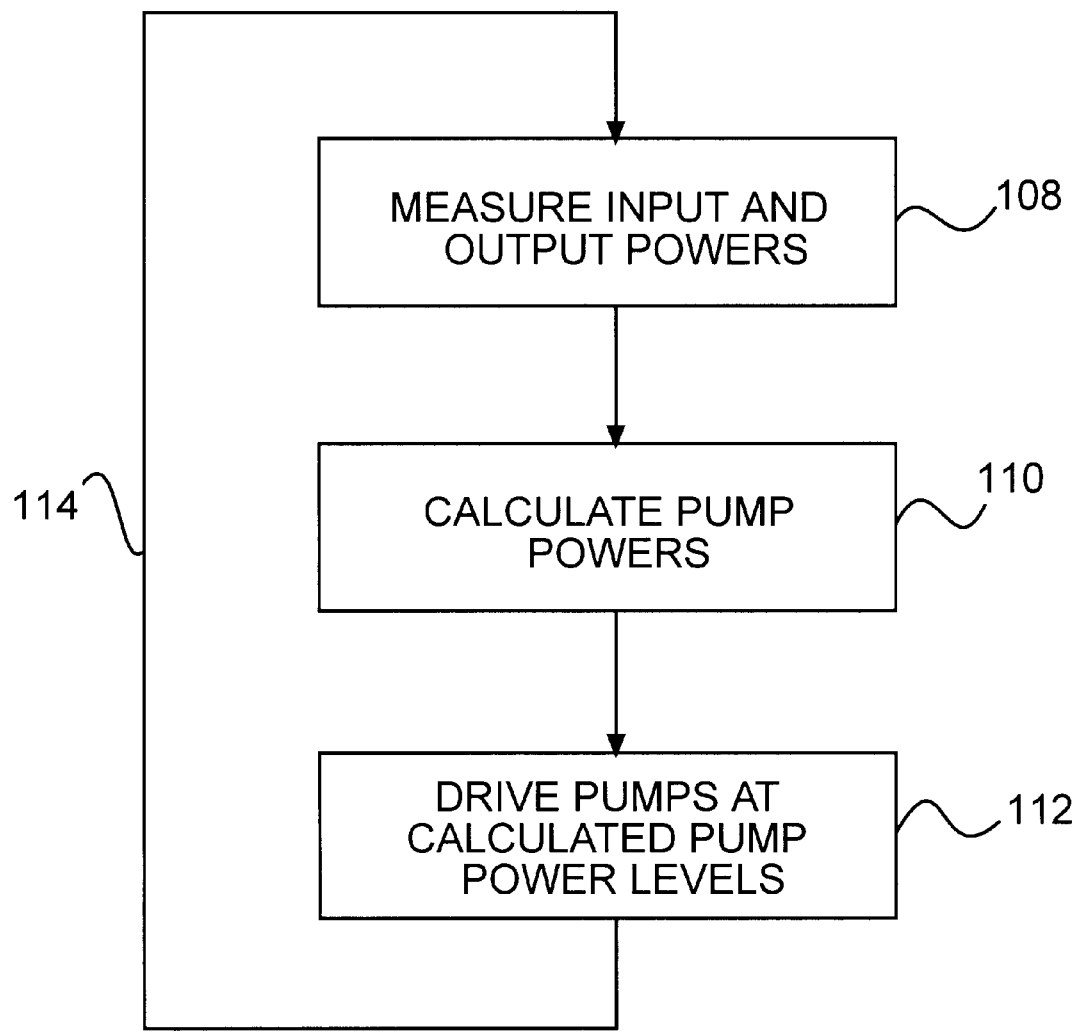
FIG. 11 is a flow chart of illustrative steps in controlling the gain stages of a booster amplifier during operation to prevent gain transients in accordance with the present invention.

Illustrative steps involved in controlling one or more of the pumps 102 of stage 46 to suppress gain transients are shown in FIG. 11. The steps of FIG. 11 may be performed by control unit 52 (using digital or analog control techniques) at the same time that control unit 52 and other equipment in the network are being used to control variable optical attenuators 54 and gain stage 46 to obtain or maintain a desired gain or output power spectrum for amplifier 18 using steps such as those shown in FIG. 8.

At step 108, taps such as taps 28c and 28d and monitoring circuitry such as monitors 96 (and filters 98 if used) may be used to monitor input and output powers n amplifier 18.

Control unit 52 may calculate or otherwise determine the appropriate pump powers for pumps 102 based on these optical power measurements at step 110.

At step 112, control unit 112 may drive pumps 102 at the drive currents needed to produce the appropriate pump powers.

As shown by line 114, the steps of FIG. 11 may be repeated continuously during operation of amplifier 18. This allows the operation of amplifier 18 to be relatively insensitive to input power fluctuations.

If desired, steps such as the steps of FIG. 11 may be used to control the gain of a stage 46 that is based on Raman-pumped fiber, semiconductor optical amplifier devices, rare-earth waveguide devices, or other suitable gain media. Analog or digital control techniques may be used to control gain transients during the steps of FIG. 11.

Figure 12:
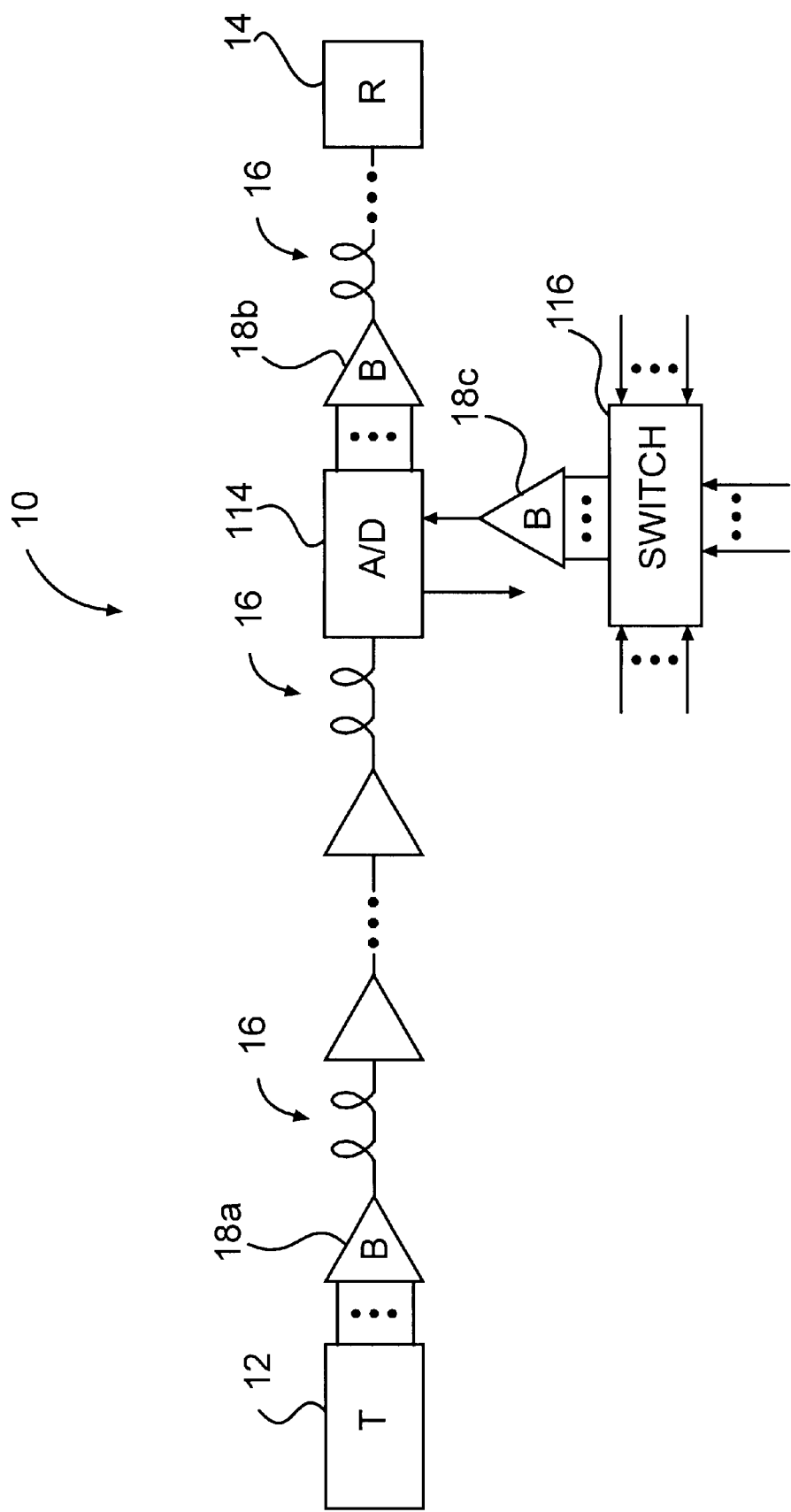
FIG. 12 is a schematic diagram showing illustrative system locations in which booster amplifiers may be used in accordance with the present invention.

Booster amplifiers 18 may be used to modify and amplify optical signals that are provided from any suitable optical communications network equipment. As shown in FIG. 12, for example, booster amplifier 18a may be used to handle signals from transmitter 12. Booster amplifier 18b may be used to handle signals from add/drop module 114. Booster amplifier 18c may be used to handle signals from switch 116 (e.g., a cross-connect switch). If desired, a single booster amplifier 18 may be used to handle signals from two or more of such sources. These are merely illustrative examples. Booster amplifiers 18 may be used at any suitable system locations.

It will be understood that the foregoing is merely illustrative of the principles of this invention, and that various modifications can be made by those skilled in the art without departing from the scope and spirit of the invention.

What is claimed is:

1. A booster amplifier that amplifies optical signals on channels at different wavelengths in a wavelength-division-multiplexing optical communications link, wherein the booster amplifier has a gain spectrum, the booster amplifier comprising:

a plurality of variable optical attenuators, each of which receives optical signals associated with a different one of the channels;

a multiplexer that combines the optical signals for each of the channels onto a single path;

at least one gain stage that amplifies the optical signals on the single path and provides corresponding amplified output signals for the wavelength-division-multiplexing optical communications link, wherein the gain stage includes at least one pump for optically pumping the gain stage; and a control unit that controls the plurality of variable optical attenuators and the pump to control the gain spectrum.

2. The booster amplifier defined in claim 1 wherein the variable optical attenuators and multiplexer are part of the same device.

3. The booster amplifier defined in claim 1 further comprising an optical monitor.

4. The booster amplifier defined in claim 1 further comprising fibers that provide mid-stage access.

5. The booster amplifier defined in claim 1 further comprising fibers that provide front-panel access for an optical monitor.

6. The booster amplifier defined in claim 1 further comprising bulkhead connectors to which input fibers that provide the optical signals to the booster amplifier are connected.

7. The booster amplifier defined in claim 1 wherein the control unit controls the pump to prevent gain transients in the gain stage due to input power fluctuations.

* * * * *